(12) United States Patent
Jakobowski (10) Patent No.: US 10,572,446 B2
(45) Date of Patent: *Feb. 25, 2020

(54) SYSTEM AND METHOD FOR STORING CONTENT ON A CONTENT DELIVERY NETWORK (71) Applicant: LEVEL 3 COMMUNICATIONS, LLC, Broomfield, CO (US)

(72) Inventor: Pawel Jakobowski, Dublin (IE)

(73) Assignee: Level 3 Communications, LLC, Broomfield, CO (US)

( * ) Notice: Subject to any disclaimer, the term of this patent is extended or adjusted under 35 U.S.C. 154(b) by 466 days.

This patent is subject to a terminal disclaimer.

(21) Appl. No.: 15/457,753

(22) Filed: Mar. 13, 2017

(65) Prior Publication Data
US 2017/0185616 A1    Jun. 29, 2017

Related U.S. Application Data

(63) Continuation of application No. 14/292,597, filed on May 30, 2014, now Pat. No. 9,594,761.

(60) Provisional application No. 61/829,438, filed on May 31, 2013.

(51) Int. Cl.
*G06F 17/30* (2006.01)
*G06F 16/13* (2019.01)
*G06F 16/955* (2019.01)
*H04L 29/08* (2006.01)

(52) U.S. Cl.
CPC ............ *G06F 16/134* (2019.01); *G06F 16/13* (2019.01); *G06F 16/9566* (2019.01); *H04L 67/02* (2013.01); *H04L 67/1097* (2013.01)

(58) Field of Classification Search
None
See application file for complete search history.

(56) References Cited

U.S. PATENT DOCUMENTS

| 6,981,180 | B1 | 12/2005 | Bailey et al. |
| 8,073,940 | B1 | 12/2011 | Richardson |
| 8,122,098 | B1 * | 2/2012 | Richardson ......... H04L 61/1511 709/217 |
| 8,397,073 | B1 * | 3/2013 | Richardson ......... H04L 67/1097 713/176 |
| 8,412,841 | B1 * | 4/2013 | Swaminathan ..... H04L 65/4084 709/231 |

(Continued)

OTHER PUBLICATIONS

European Examination Report, dated Jun. 6, 2018, Application No. 14804865.5, filed May 30, 2014; 6 pgs.

(Continued)

*Primary Examiner* — Hung D Le (57) ABSTRACT

Aspects of the present disclosure involve systems, methods, computer program products, and the like, for grouping a plurality of content files in content delivery network (CDN) for easier storage and access. In one embodiment, the CDN may store related files in one or more container files within the CDN to reduce the number of stored files. In addition, a manifest provided to the requesting device relating to the content may be altered to point to the container files rather than the separate content files within the container. The manifest may also provide information to the requesting to extract and process the content files within the container file in the proper order for playing on the requesting device.

18 Claims, 4 Drawing Sheets

(56) References Cited

U.S. PATENT DOCUMENTS

| | | | |
|---|---|---|---|
| 8,719,876 B2* | 5/2014 | Kotecha | H04L 65/4084 |
| | | | 725/68 |
| 8,909,646 B1 | 12/2014 | Fabrikant | |
| 2003/0149581 A1 | 8/2003 | Chaudhri et al. | |
| 2003/0204602 A1* | 10/2003 | Hudson | D01D 5/423 |
| | | | 709/228 |
| 2005/0114296 A1* | 5/2005 | Farber | G06F 16/164 |
| 2006/0218601 A1 | 9/2006 | Michel | |
| 2007/0201502 A1* | 8/2007 | Abramson | H04L 67/32 |
| | | | 370/429 |
| 2009/0193485 A1 | 7/2009 | Rieger | |
| 2009/0248886 A1 | 10/2009 | Tan | |
| 2009/0307571 A1 | 12/2009 | Gowda | |
| 2010/0094967 A1 | 4/2010 | Zuckerman | |
| 2010/0211987 A1 | 8/2010 | Chou | |
| 2010/0332595 A1* | 12/2010 | Fullagar | H04N 7/17354 |
| | | | 709/203 |
| 2011/0082982 A1 | 4/2011 | Harvell | |
| 2011/0087794 A1* | 4/2011 | Li | H04N 5/765 |
| | | | 709/231 |
| 2011/0252082 A1 | 10/2011 | Cobb | |
| 2011/0252100 A1 | 10/2011 | Raciborski | |
| 2012/0124606 A1* | 5/2012 | Tidwell | H04N 21/25833 |
| | | | 725/17 |
| 2012/0158527 A1 | 6/2012 | Cannelongo | |
| 2012/0158713 A1 | 6/2012 | Jin | |
| 2012/0254257 A1 | 10/2012 | Mitra et al. | |
| 2012/0284290 A1* | 11/2012 | Keebler | G06F 16/958 |
| | | | 707/756 |
| 2013/0007263 A1 | 1/2013 | Soroushian et al. | |
| 2013/0097309 A1* | 4/2013 | Ma | H04L 29/08099 |
| | | | 709/224 |
| 2013/0132469 A1 | 5/2013 | Levicki | |
| 2013/0132986 A1 | 5/2013 | Mack et al. | |
| 2014/0089990 A1 | 3/2014 | van Deventer | |
| 2014/0172970 A1 | 6/2014 | Newton et al. | |
| 2014/0358925 A1 | 12/2014 | Jakobowski | |

OTHER PUBLICATIONS

Extended European Search Report, dated Dec. 6, 2016, Application No. 14804865.5, filed May 30, 2014; 8 pgs.

International Search Report, dated Oct. 10, 2014, Int'l Appl. No. PCT/US14/040378, Int'l Filing Date May 30, 2014; 3 pgs.

Written Opinion of the International Searching Authority, dated Oct. 10, 2014, Int'l Appl. No. PCT/US14/040378, Int'l Filing Dated May 30, 2014; 5 pgs.

Summons to Attend Oral Proceedings, dated Feb. 6, 2019, Application No. 14804865.5, filed May 30, 2014; 8 pgs.

European Decision to Refuse, dated Jul. 22, 2019, Application No. 14804865.5, filed May 30, 2014; 38 pgs.

European Preliminary Opinion, dated Jul. 1, 2019, Application No. 14804865.5, filed May 30, 2014; 15 pgs.

* cited by examiner

SYSTEM AND METHOD FOR STORING CONTENT ON A CONTENT DELIVERY NETWORK

CROSS-REFERENCE TO RELATED APPLICATIONS

This application is a continuation of and claims the benefit of priority to U.S. Non-Provisional application Ser. No. 14/292,597, entitled "SYSTEM AND METHOD FOR STORING CONTENT ON A CONTENT DELIVERY NETWORK," filed on May 30, 2014, the entire contents of which are incorporated by reference herein for all purposes. Application Ser. No. 14/292,597 claims priority under 35 U.S.C. § 119(e) to U.S. Provisional Application No. 61/829,438, entitled "SYSTEM AND METHOD FOR STORING CONTENT ON A CONTENT DELIVERY NETWORK," filed on May 31, 2013, the entire contents of which are incorporated by reference herein for all purposes.

TECHNICAL FIELD

Aspects of the present invention generally relate to systems and methods for implementing a telecommunications network or content distribution network, and more specifically for storing content files in a content distribution network.

BACKGROUND

Content Delivery Networks (CDN) are increasingly used to distribute content, such as videos, multimedia, images, audio files, documents, software, and other electronic resources, to end users on behalf of one or more content providers. Typically, a CDN is a large distributed system of servers that are accessible over a network connection (such as the Internet). The servers store the available content and provide the content to users of the CDN through the network connection. Using a CDN allows the content providers to increase the speed and reliability of content delivery without deploying additional infrastructure and additional costs. Moreover, the end users typically obtain the content with fewer delays.

Typically, content provided by a CDN is stored in files of a predetermined length and/or size. For example, video files offered by a CDN may be stored in the CDN as one or more 10-second video files. To obtain the full content, a requesting device requests each file that, when combined, comprises the full requested content. The list of files needed to comprise the full requested content is generally provided to the requesting device through a manifest that is then read to obtain an identification of the files that comprise the full requested content. By reading the manifest, the requesting device requests each file that comprises the desired content and provides the content of each file to a user of the requesting device. However, for large date content, such as live streaming content (content that is provided to the CDN from a content provider as the content is being produced or recorded), the number of needed files to produce the full requested content is often large and may be troublesome for the CDN to store and manage. As such, large amounts of processing power are used by a CDN to maintain, track and store content files on the servers of the CDN.

It is with these and other issues in mind that various aspects of the present disclosure were developed.

SUMMARY

One implementation of the present disclosure may take the form of a method for storing content in a content delivery network (CDN). The method includes the operations of receiving a first plurality of content segment files and a manifest associated with a content presentation, each of the first plurality of content segment files including a first portion of the content presentation, associating the first plurality of content segment files as including the first portion of the content presentation and storing the associated first plurality of content segment files in a first container file on a storage element of the CDN. In addition, the method includes the operation of altering the manifest associated with the content presentation to comprise a storage location of the first container file on the storage element of the CDN.

Another implementation of the present disclosure may take the form of a content distribution network (CDN). The CDN includes a plurality of content storage elements and a CDN component. The CDN component is configured to receive a first plurality of content segment files and a manifest associated with a content presentation, each of the first plurality of content segment files including a first portion of the content presentation, store the first plurality of content segment files in a first container file on a storage element of the CDN, the first container file comprising a storage location in the storage element of at least one of the first plurality of content segment files and a linked list to a storage location of each of the other of the first plurality of content segment files in the first container and alter the manifest associated with the content presentation to comprise the storage location of the first container file on the storage element of the CDN.

Yet another implementation of the present disclosure may take the form of a system for operating a content distribution network (CDN). The system includes a server comprising a processor and a computer-readable medium associated with the processor. The computer-readable medium includes instructions stored thereon and executable by the processor to perform operations. The operations include receiving a first plurality of content segment files and a manifest associated with a content presentation, each of the first plurality of content segment files including a first portion of the content presentation, storing the first plurality of content segment files in a first container file on a storage element of the CDN, the first container file comprising a storage location in the storage element of at least one of the first plurality of content segment files and a linked list to a storage location of each of the other of the first plurality of content segment files in the first container and altering a manifest associated with the content presentation to comprise the storage location of the first container file on the storage element of the CDN.

DETAILED DESCRIPTION

Aspects of the present disclosure involve systems, methods, computer program products, and the like, for grouping a plurality of content files in content delivery network (CDN) for easier storage and access. As mentioned above, some content may require only a few files to provide the full requested content to the requesting device. For example, a short video clip available from the CDN may only include three or four content files to be provided to the requesting device. Thus, the manifest that provides the location of the content files is similarly short and easily managed by the CDN. Also, it is typically not processor-intensive for the CDN to maintain the location and storage of a few content files associated with a short video clip.

Conversely, for large content available from the CDN, such as live streaming content (content that is provided to the CDN from a content provider as the content is being produced or recorded), the number of content files to produce the full requested content is often large and may be troublesome to store and manage. For example, live streaming of a concert or sporting event may require several hundred to several thousand files that are each requested by the requesting device and processed to render the content on the requesting device. Each content file may include a small portion of the overall content presentation. As the content stretches into hours in length, the number of content files for the presentation grows quickly. As each of the content files for the large content presentation is provided by the content provider to the CDN, the CDN attempts to store the content files in the same or similar location within the CDN so that each file is easily available upon request from a requesting device. However, these files may often be stored in disparate locations in the CDN as more and more incoming content files from multiple content providers are provided to the CDN. When related content files are disparately stored, storing and and/or tracking of each content file for any available presentation from the CDN may become time and processing consuming. Further, modifying content manifests related to a content presentation of the CDN may also become burdensome to the CDN.

In one embodiment of the present disclosure, systems, methods, computer program products, and the like, are providing for grouping a plurality of content files in a CDN into containers for easier storage, access and management. In general, the CDN may store related files in one or more containers within one or more storage elements of the CDN to reduce the overall number of stored files or maintained locations of the content files. For example, the CDN may recognize five content files received from a content provider as relating to or part of a single content event, such as live streaming of a sporting event. Rather than storing each content file individually within the CDN, the CDN may gather the five content files into a single container file and store the container file within a storage element of the CDN, such as a content server. In addition, the manifest received from the content provider and transmitted to the requesting device may be altered to point to the container file rather than the separate content files within the container. The manifest may also provide information to the requesting device to extract and process the content files within the container file in the proper order for playing on the requesting device. In this manner, the CDN reduces the number of content files stored on the CDN and reduces the number of files requested by the requesting device for playing the content. Because the files are gathered into larger container files, the CDN may operate faster and more efficiently as the number of file requests and number of different storage locations the files are stored within the CDN are reduced.

Figure 1:
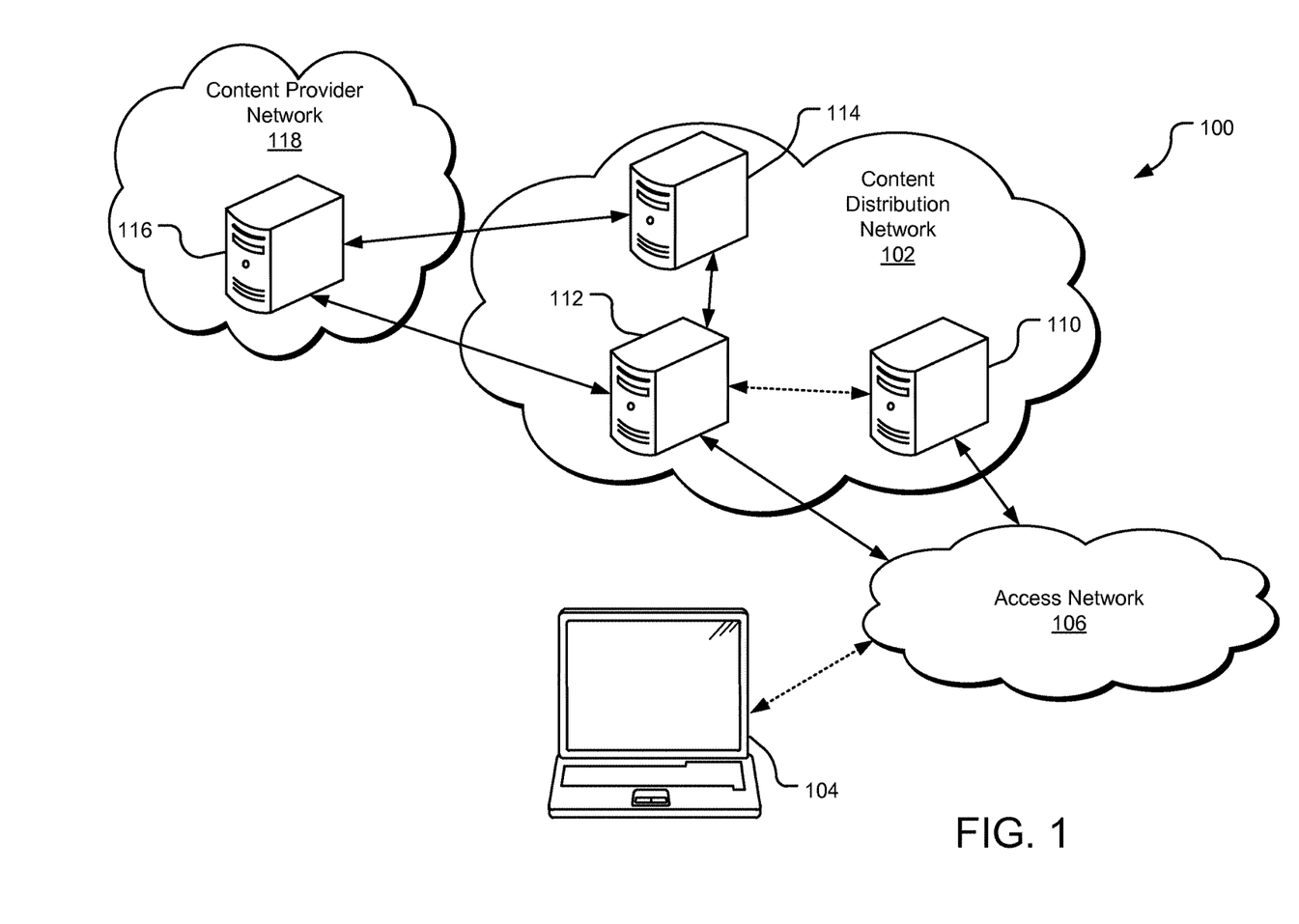
FIG. 1 is an example network environment for distributing content over a content delivery network (CDN).

An example network environment 100 for distributing content to a requesting device is shown in FIG. 1. The environment includes a CDN 102, which may include components of one or more networks. In one implementation, the CDN 102 is communicably coupled to one or more access networks 106 that provide access to the CDN to a user device 104. The access network 106 may be under the control of or operated/maintained by one or more entities, such as, for example, one or more Internet Service Providers (ISPs) or Mobile Network Operators (MNOs) that provide access to the CDN 102. Thus, for example, the access network 106 may provide Internet access to a user device 104. Through the access network 106, a user (or more particularly, a user device 104 under control by a user to the CDN or telecommunications network) may access the CDN 102. In general, the user device 104 provides a request for content to the access network 106 that is forwarded to the CDN 102 which, in response, provides the requested content to the user device through the access network or through an alternate network path.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content.

In one implementation, the CDN 102 includes an edge server 112, which may cache content from another server to make it available in a more geographically or logically proximate location to the user device 104. The edge server 112 may reduce network loads, free capacity, lower delivery costs, and/or reduce content download time. The edge server 112 is configured to provide requested content to a requestor, which may be the user device 104 or an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In one implementation, the content available from the CDN is split and stored into separate content files in one or more storage elements in the CDN. For example, a video file may be stored in segments or chunks of approximately two to ten second fragments stored on a content server 114 of the CDN. In another example, the segment files may be stored on a plurality of storage elements, such that a first segment file is stored on a first content server while a second segment is stored on a second content server. In general, content available from the CDN may be broken up into any number of content files and stored on any number of storage elements of the CDN.

Upon a request from the user device 104, each of the content segments may be provided to the requesting device. In particular, the requesting device 104, upon referencing a content manifest that contains a listing of the content files and locations of those content files within the CDN, may request each segment file. The content segments may be encoded at various bit rates, such that the user device 104 may request segments of an appropriate bit rate based on network conditions as the content is being presented on the user device 104. Segmentation of the content permits seeking parts of the media (e.g., different chapters in a movie) without needing to download the entire content file. The separate content files for a particular instance of content of the CDN 102 may be created by the CDN upon receiving the content from the content provider 118 or the content provider network may provide the separate segments to the CDN for storage in the CDN. Regardless of the embodiment utilized, it is often the case that a CDN 102 will store content in various content files stored in various storage elements of the network.

In one implementation, to retrieve content segments from different storage locations in the network environment 100 and to configure and sequence the segments, a manifest is utilized. In general, the manifest includes a list of the files in the CDN 102 that provide the requested content. The manifest and the content segments may be fetched using a data transport protocol, including, but not limited to, File Transport Protocol (FTP), Hypertext Transport Protocol (HTTP), etc. The manifest may include a series of uniform resource locators (URL) pointing to the storage locations within the CDN 102 of the corresponding content segments. Stated differently, each of the entries in the manifest specifies a relative URL to identify the location of corresponding content segments at each bit rate. Once a manifest is received, the user device 104 requests segments of the content of an appropriate bit rate (e.g., based on the rate at which the user device 104 is receiving the content data) in a sequence specified by the manifest subset as the presentation of the content progresses. In general, the content manifest is provided to the CDN from the content provider when the content is also provided to the CDN. In this form, the manifest typically includes a listing of the files of the content. Upon receipt, the CDN may modify the manifest to indicate the storage location of the files of the content in the CDN. This modified manifest is then provided to a user's device upon request for access to the files of the content.

In one implementation, after a session is initiated by requesting content using the user device 104, a URL to the manifest is returned and an appropriate storage location (e.g., geographically or logically proximate) from which one or more first content segments associated with the manifest may be retrieved is resolved through the CDN 102. The user device 104 requests the first content segments as specified by the manifest. Upon retrieval of the first segment, the user device 104 then requests the next segment in the manifest for retrieval and processing by the user device. In this manner, the content is provided by the CDN 102 to the user device 104 through the use of the manifest and the content segments.

As should be appreciated, providing small segments of a large content presentation to the user device 104 from disparate storage locations within the CDN 102 is both time consuming and processor-intensive for the CDN. Thus, the present disclosure provides for storing related content files or segments of the overall content presentation in containers to reduce the number of files the requesting device 104 requests and the number of files the CDN 102 must locate and provide to the requesting device.

Figure 2:
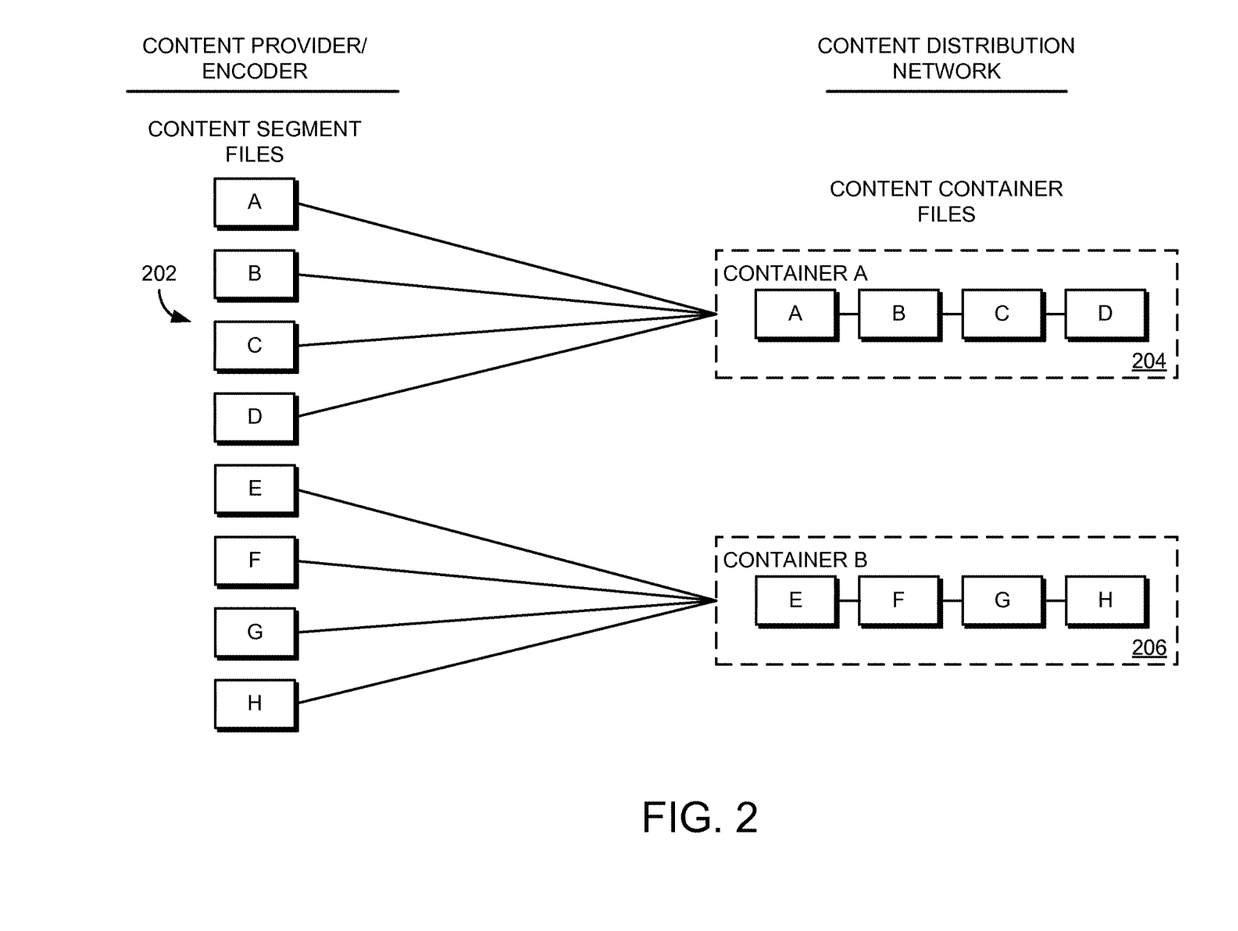
FIG. 2 is a block diagram illustrating a CDN receiving a plurality of content files and grouping the plurality of content files into one or more container files for storage on the CDN.

In particular, FIG. 2 illustrates a CDN configured to gather the content segments of a content presentation and store one or more of the segment files in a container file. Rather than providing storage locations of the content segment files to the requesting device, the CDN 102 may provide the storage location of the container file. Rather, the one or more container files associated with the requested content may be included in the manifest and requested by the user device 104 when requesting the content. As such, through the embodiment illustrated in FIG. 2, the CDN 102 reduces the number of files requested by the user device 104 to obtain the content presentation and said containers can be more easily stored and retrieved by the CDN upon the request.

As shown in FIG. 2, a content provider (such as the content provider network 118 illustrated in FIG. 1) includes several content segment files 202 for a content presentation. For example, the content segment files 202 may form part of a live streaming event available through a CDN. In particular to the illustration of FIG. 2, the segment files 202 include segment files A through H. As discussed above, the segment files include a segment of a content presentation available through the CDN, such as a ten second video file that is a portion of a longer video file available through the CDN 102. In general, the segment files 202 may include any portion of a content presentation. In general, the segment files 202 are provided by a content provider 118 to the CDN, or obtained from the content provider 118, and encoded as part of a larger content presentation through a network connection between the CDN and the content provider. As also mentioned above, any number of segment files 202 may be associated with the available content, including more than ten overall content segment files. In the example of a live broadcast, the segment files 202 may be a continual influx of segment files to be provided or obtained to the CDN 102 as the live broadcast is captured by the content provider network 118.

As the content segment files 202 are provided to the CDN 102 from the content provider 118, the CDN may determine that two or more of the segment files are related and stores the related files into a container file on the CDN. In the example shown in FIG. 2, related segment files A through D are combined and stored in container file A 204 and related segment files E through H are combined and stored in container file B 206. However, FIG. 2 is but one example of the gathering and combining of segment files into containers that can be performed by the CDN 102. In general, any number of segment files of a content presentation may be combined in a container file. In one example, each container file may include as many content segment files up to 100 megabyte (MB) of memory. Thus, some container files may include more segment files than other container files within the CDN 102 if the segment content files vary is memory size. In another example, each container file may include four content segment files, regardless of the size of the individual segment files. The constraints on the number of segment files included in each container file may be set by the CDN 102 as desired by a CDN administrator. Once created, the container files 204, 206 may then be stored in the CDN 102, such as on a content server of the CDN. In particular, the segment files in each container may be stored together on the same content server, with some indication of the relationship between the content segment files. For example and as described in more detail below, each container may include links between the storage locations of the content segment files in the storage element of the CDN to indicate that the content segment files are related or part of the same content presentation.

In addition to gathering and combining the segment files into container files, the CDN 102 may also maintain a location within the storage elements of the CDN for each of the segment files included in the container file. For example, container file A 204 includes segment files A through D. Thus, the CDN 102 may maintain the location of each of segment files A through D within container file A 204. In one embodiment, the location of the segment files A through D may be maintained as a linked list of storage locations. The location of the segment files may be stored along with the container file or separate from the container file. Also, this information may be included in a manifest provided to a requesting device when request for the content is received by the CDN. For example, the manifest may include the location of the container file that includes the content segment files as part of the content presentation. By combining a plurality of segment files 202 received from a content provider 118 into one or more container files 204, 206, the CDN 102 can reduce the number of files that are stored and maintained by the CDN to provide the content in the segment files.

Figure 3:
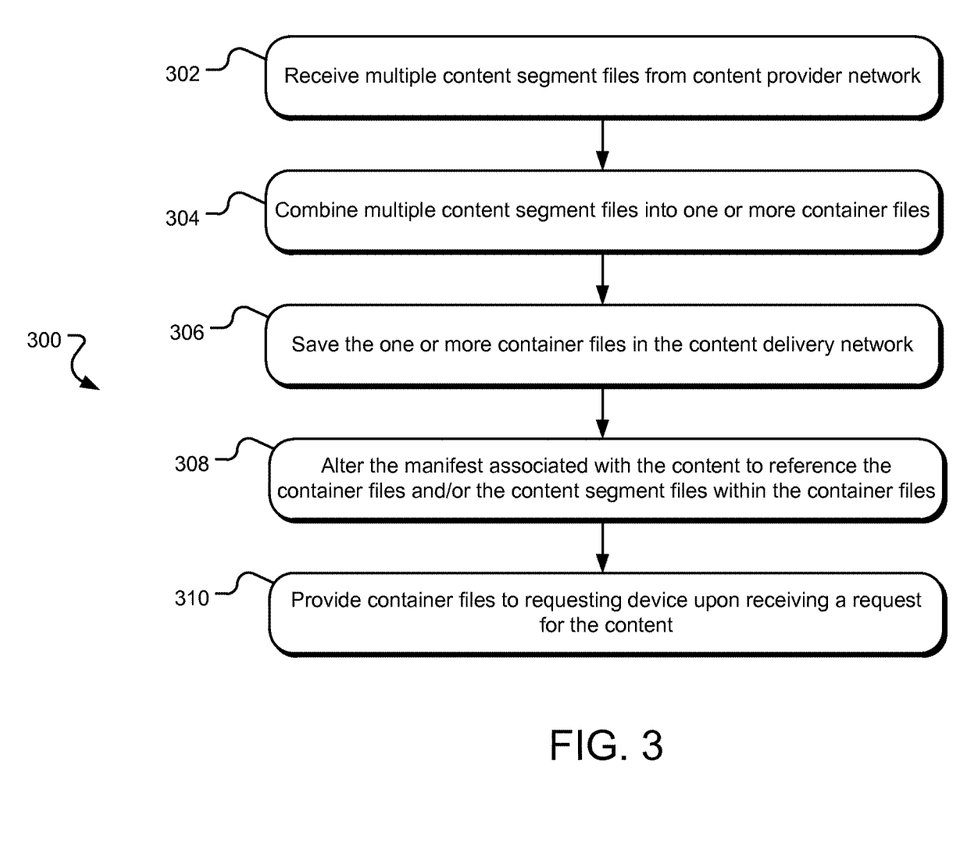
FIG. 3 is a flowchart illustrating a method for a CDN to group a plurality of content files into one or more containers for storing and processing on the CDN.

Turning now to FIG. 3, a method for a CDN to group a plurality of content files into one or more containers for storing and processing on the CDN is shown. In general, the operations of FIG. 3 are performed by a portion, a component, or multiple components of the CDN. However, in other embodiments, the operations may be performed by the content provider prior to transmitting the content to the CDN or the operations may be performed by a combination of the CDN and the content provider. In one example, a content server of the CDN performs the actions of the method of FIG. 3.

Beginning in operation 302, the CDN receives (or obtains) multiple content segment files from the content provider network. Each of the content segment files contains a portion of a content presentation available through the CDN. In addition, the CDN may receive a manifest from the content provider that lists or otherwise indicates the separate files that comprises the content. In the example of a live streaming event, the content may also include an indication of future content segment files that form part of the live streaming event. Further, as shown above in FIG. 2 and in operation 304, the CDN combines or otherwise associates a plurality of content segment files of the content presentation into one or more container files. The container files may include any number of segment files as defined by the CDN. For example, the container files may include any number of content segment files up to a certain memory threshold, or up to a specific number of content segment files. The upper threshold of segment files in the container may be set by a CDN administrator, the CDN, or the content provider.

In one embodiment, the CDN may utilize a manifest provided by the content provider to determine how and which content segment files are stored in which containers. For example, the manifest may identify which content segment files belong to the same content stream and, thus, may be stored in the same containers related to the content. For a live streaming event, the content segment files may be identified as belonging to a portion of the live event (i.e., content segment from 0-2 minutes, content segment from 2-5 minutes, and so on). For other content, the content segment files for the content may be identified as belonging to the content. With this information, the CDN can determine which content segment files are stored together in a container in the CDN.

Although the CDN may rely on the manifest to determine which content segment files are related to the same content and are thus stored in the same containers, other heuristics concerning the CDN, content provider or content may also be used to determine how to store the content segment files in the containers. For example, the CDN may store content segment files in containers based on which content provider transmits the files. In another example, the CDN may perform an analysis of each content segment file received to determine which content the segment files form a portion. In yet another example, the content segment files are grouped into containers based on a content or segment file URL associated with the segment files. In particular, a first content segment file may have a URL similar to /path/to/stream/chunk1 and a second content segment file may have a URL similar to /path/to/stream/chunk2. In this case, the CDN may assume that the two content segment files belong to the content and may be stored together in the same container.

In operation 306, the CDN then saves the one or more container files in the CDN, such as on a content server associated with the CDN. The container files containing the content segment files may include a link between the content segment files within the container. Using the example illustrated in FIG. 2, the container 204 may include four content segment files (content files A-D). The container 204, in one embodiment, includes a storage location of content segment file A in the storage element of the CDN. Also, the storage location for content segment file B may be included in the container, such as a pointer from the storage location of content segment file A to content segment file B. In a similar manner, the linked list of the container includes pointers to content segment file C and content segment file D. In some embodiments, the container may also include an indication of the order in the content presentation that each content segment file should be placed. For example, the container may include an indication that content segment file A is the first segment of the content presentation, the content segment file B is the second segment of the content presentation, and so on. In the example of a live streaming event, the container (or content segment files) may include a timestamp or other indication of the order in which the content segment files of the content presentation should be shown.

In operation 308, the CDN alters the manifest associated with the content presentation to reflect the storage of the content segment files into container files. In particular, the manifest may be altered to include a URL to the container files, rather than to each individual segment files. Thus, the requesting device may access the container at the provided URL and the content segment files within the container may be provided to the requesting device based on the linked listing of the content segment files within the container. In other words, by accessing the container file at the provided URL, the first content segment file within the container may be provided or streamed to the requesting device. Upon delivery of the first content segment file, the linked list of the container may indicate that the second content segment file in the container is then provided to the requesting device. In other embodiments, more than one of the content segment files within the container may be transmitted to the requesting device once the container file is accessed. In this embodiment, the content segment files may be stored by the requesting device until the content presentation requires the content segment file to show the content presentation to a user of the CDN. Thus, some or all of the content segment files in the container may be transmitted to the requesting device when a request for the files is received by the CDN.

As mentioned above, a manifest is typically provided to a requesting device connected to the CDN that provides a location (such as a storage address) within the CDN from which the content segment files may be retrieved. In the embodiment where content segment files are stored in container files within the CDN, the manifest may include many different types of storage locations. In one embodiment, the manifest may include the storage location of the container files associated with the content presentation. Upon accessing the container files, each content segment file may be transmitted to the requesting device, either in series or in a parallel manner. In this embodiment, the content segment files may include an indication of the proper order the content segments should be presented as the content presentation.

In another embodiment, the manifest may be altered to include pointers to locations within each container file that corresponds to the segment files within the container files. This alteration allows the receiving device to request the container file, obtain the segment files within each container file and display each segment file in the proper order by reading the information contained within the manifest. As mentioned, this manifest may be altered or created by the CDN or the provider network.

For live events, the manifest may be altered or continually updated as new segment files of the live event are received at the CDN. Further, a newly updated manifest may be sent to a requesting device as new segment files are received and container files are created by the CDN. For static content available through the CDN, the manifest may be altered upon creation of the container files that define the content and provided to a requesting device upon request. In either event, the manifest providing links to the container files and the content segments stored in the container files may be altered or created to reflect the changes made to the storage of the segment files of the content.

In yet another embodiment, the CDN may not alter the manifest associated with the content as indicated in operation 308. Rather, the CDN may maintain a record or list of the containers in which the content segment files for the content are stored. Upon receiving a request for one or more of the content segment files stored in the containers of the CDN, the CDN may extract the requested segment file from the container in which the file is stored. The container including the content segment file may be determined from the list maintained by the CDN. Upon extraction from the container, the CDN may provide the content segment file to the requester, as described in more detail below with reference to operation 310. In one embodiment, the record or list of the content segment file in the container may be included in metadata associated with the container. Thus, some or all of the containers stored in the CDN may include metadata that indicates the content segment file or files in each container.

Through this particular embodiment, the CDN would not need to alter the manifest provided by the content provider to indicate the container file in the CDN. Rather, the manifest may point to the content segment file for a particular content and a request for the segment file may be made by the user's device. The container location for the content segment file may then be interpreted by the CDN and the segment file extracted from the container by the CDN. As such, the CDN is able to simplify and reduce the cost of storing each content segment file in a separate file (by storing segment files in containers) while also not altering the manifest to reflect the storage of the content segment files in containers. This embodiment may be utilized for requesting devices that will only accept particular manifests.

In operation 310, the CDN (or content provider), upon receiving a request for the content, provides the manifest to the requesting device. Upon reading the manifest, the requesting device requests the first container file associated with the content. Upon receiving the request, the CDN then provides the first container file for the content. The process of receiving a request for the content container files and providing of the container files continues until the entire content is provided or the requesting device ceases to request the container files. In another example, the requesting device may request a content segment that lies somewhere within the content presentation. In such an example, the manifest may provide the requesting device the location of the container with the desired content segment file for retrieval by the requesting device. This content segment file may be the first content segment file in the container file or another content segment file. Thus, the manifest provided to the requesting device may contain an indication of which content segment files are included in each container file of the CDN such that the container file for a particular content segment file may be located in the CDN. As such, through the operations of FIG. 3, the CDN can limit the number of files stored and maintained by the CDN, while still providing the entire requested content to the requesting device.

Figure 4:
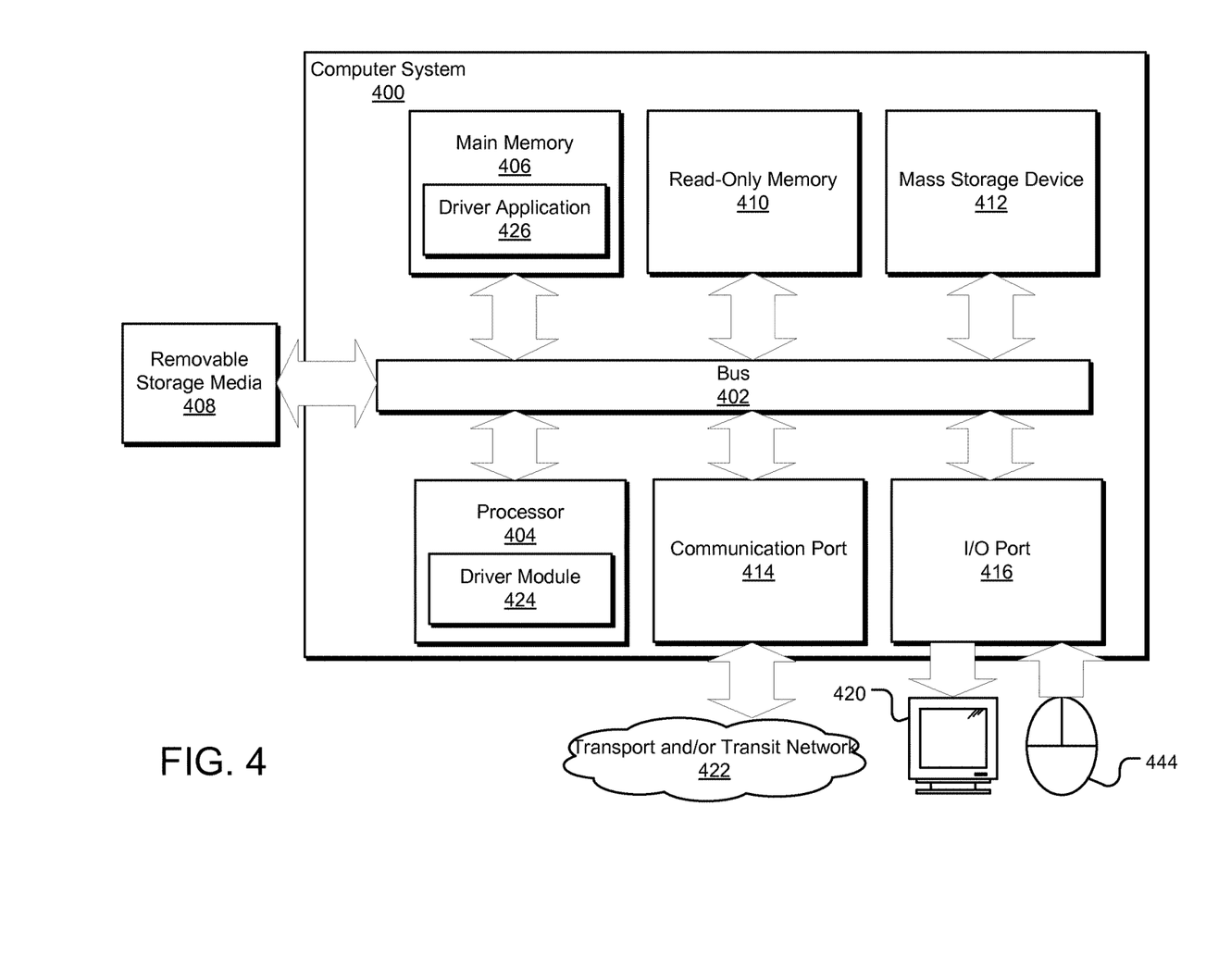
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the CDN and/or content provider network disclosed above. In general, the computing device of FIG. 4 may represent a server or storage server of the CDN or content provider network. The computer system 400 includes one or more processors 404. The processor 404 may include one or more internal levels of cache (not shown) and a bus controller or bus interface unit 402 to direct interaction with the processor 404. The processor 404 may include a driver module 424 that specifically implements the various methods discussed herein. The main memory 406 may include one or more memory cards and a control circuit (not shown), or other forms of removable memory, and may store a driver application 426 including computer executable instructions, that when run on the processor 404, implement the methods and system set out herein. Other forms of memory, such as a mass storage device 412, a read only memory 410, and a removable storage memory 408, may also be included and accessible, by the processor (or processors) 404 via the bus 402.

The computer system 400 may further include a communication port 414 connected to a transport and/or transit network 422 by way of which the computer system 400 may receive network data useful in executing the methods and system set out herein as well as transmitting information and network configuration changes determined thereby. The computer system 400 may include an I/O device 416, or other device, by which information is displayed, such as at display screen 420, or information is input, such as input device 444. The input device 444 may be alphanumeric input device, including alphanumeric and other keys for communicating information and/or command selections to the processor. The input device 444 may be another type of user input device including cursor control, such as a mouse, a trackball, or cursor direction keys for communicating direction information and command selections to the processors 404 and for controlling cursor movement on the display device 420. In the case of a tablet device, the input may be through a touch screen, voice commands, and/or Bluetooth connected keyboard, among other input mechanisms. The system set forth in FIG. 4 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for storing content in a content delivery network (CDN), the method comprising:
   receiving at the CDN:
      a first plurality of content files and a corresponding first manifest, the first plurality of content files comprising a portion of a first content stream, wherein the first manifest identifies each of the first plurality of content files;
      a second plurality of content files and a corresponding second manifest, the second plurality of content files comprising a portion of a second content stream, wherein the second manifest identifies each of the second plurality of content files;
   based on a criterion:
      determining that the first plurality of content files are associated with the first content stream; and
      determining that the second plurality of content files are associated with the second content stream;
   storing:
      the first plurality of content files in a first container file on a storage element of the CDN;
      the second plurality of content files in a second container file on a storage element of the CDN; and
   altering:
      the first manifest associated with the first content stream to comprise a first storage location of the first container file on the storage element of the CDN; and
      the second manifest associated with the second content stream to comprise a second storage location of the second container file on the storage element of the CDN.

2. The method as recited in claim 1, wherein the criterion comprises one or more content providers from which given content files are received at the CDN.

3. The method as recited in claim 1, wherein the criterion comprises one or more Uniform Resource Locators (URLs) associated with given content segments received at the CDN.

4. The method as recited in claim 1, wherein the first container file comprises a different number of content segments than the second container file.

5. The method as recited in claim 4, wherein a memory size associated with the first container file is the same as a memory size associated with the second container file.

6. The method as recited in claim 1, wherein the first plurality of content files are associated with a different bitrate than the second plurality of content files.

7. A content distribution network comprising:
   a plurality of content storage elements; and
   a content delivery network (CDN) component configured to:
   receiving:
      a first plurality of content files and a corresponding first manifest, the first plurality of content files comprising a portion of a first content stream, wherein the first manifest identifies each of the first plurality of content files;
      a second plurality of content files and a corresponding second manifest, the second plurality of content files comprising a portion of a second content stream, wherein the second manifest identifies each of the second plurality of content files;
   based on a criterion:
      determining that the first plurality of content files are associated with the first content stream; and
      determining that the second plurality of content files are associated with the second content stream;
   storing:
      the first plurality of content files in a first container file on a storage element of the CDN;
      the second plurality of content files in a second container file on a storage element of the CDN; and
   altering:
      the first manifest associated with the first content stream to comprise a first storage location of the first container file on the storage element of the CDN; and
      the second manifest associated with the second content stream to comprise a second storage location of the second container file on the storage element of the CDN.

8. The content distribution network as recited in claim 7, wherein the criterion comprises one or more content providers from which given content files are received at the CDN.

9. The content distribution network as recited in claim 7, wherein the criterion comprises one or more Uniform Resource Locators (URLs) associated with given content segments received at the CDN.

10. The content distribution network as recited in claim 7, wherein the first container file comprises a different number of content segments than the second container file.

11. The content distribution network as recited in claim 10, wherein a memory size associated with the first container file is the same as a memory size associated with the second container file.

12. The content distribution network as recited in claim 7, wherein the first plurality of content files are associated with a different bitrate than the second plurality of content files.

13. A system for operating a content distribution network (CDN), the system comprising:
 a server comprising:
  a processor; and
  a computer-readable medium associated with the processor and including instructions stored thereon and executable by the processor to:
  receiving:
   a first plurality of content files and a corresponding first manifest, the first plurality of content files comprising a portion of a first content stream, wherein the first manifest identifies each of the first plurality of content files;
   a second plurality of content files and a corresponding second manifest, the second plurality of content files comprising a portion of a second content stream, wherein the second manifest identifies each of the second plurality of content files;
  based on a criterion:
   determining that the first plurality of content files are associated with the first content stream; and
   determining that the second plurality of content files are associated with the second content stream;
  storing:
   the first plurality of content files in a first container file on a storage element of the CDN;
   the second plurality of content files in a second container file on a storage element of the CDN; and
  altering:
   the first manifest associated with the first content stream to comprise a first storage location of the first container file on the storage element of the CDN; and
   the second manifest associated with the second content stream to comprise a second storage location of the second container file on the storage element of the CDN.

14. The system as recited in claim 13, wherein the criterion comprises one or more content providers from which given content files are received at the CDN.

15. The system as recited in claim 13, wherein the criterion comprises one or more Uniform Resource Locators (URLs) associated with given content segments received at the CDN.

16. The system as recited in claim 13, wherein the first container file comprises a different number of content segments than the second container file.

17. The system as recited in claim 16, wherein a memory size associated with the first container file is the same as a memory size associated with the second container file.

18. The system as recited in claim 13, wherein the first plurality of content files are associated with a different bitrate than the second plurality of content files.

* * * * *